US010007267B2

(12) United States Patent
Yu et al.

(10) Patent No.: US 10,007,267 B2
(45) Date of Patent: Jun. 26, 2018

(54) SMART CLEANER

(71) Applicant: JIANGSU MIDEA CLEANING APPLIANCES CO., LTD., Suzhou (CN)

(72) Inventors: Qinghao Yu, Suzhou (CN); Qiang Shen, Suzhou (CN)

(73) Assignee: JIANGSU MIDEA CLEANING APPLIANCES CO., LTD., Suzhou (CN)

( * ) Notice: Subject to any disclaimer, the term of this patent is extended or adjusted under 35 U.S.C. 154(b) by 70 days.

(21) Appl. No.: 15/235,606

(22) Filed: Aug. 12, 2016

(65) Prior Publication Data

US 2017/0147002 A1 May 25, 2017

(30) Foreign Application Priority Data

Nov. 25, 2015 (CN) .......................... 2015 1 0827895

(51) Int. Cl.
| | |
|---|---|
| *A47L 11/40* | (2006.01) |
| *G05D 1/02* | (2006.01) |
| *G06K 9/00* | (2006.01) |
| *G06K 9/62* | (2006.01) |
| *H04N 7/18* | (2006.01) |
| *G05D 1/00* | (2006.01) |

(52) U.S. Cl.
CPC ......... *G05D 1/0246* (2013.01); *G05D 1/0016* (2013.01); *G05D 1/0217* (2013.01);
(Continued)

(58) Field of Classification Search
CPC .. G05D 1/0246; G05D 1/0016; G05D 1/0217; G05D 1/0225; G05D 1/0203;
(Continued)

(56) References Cited

U.S. PATENT DOCUMENTS 9,820,625 B2 * 11/2017 T P ..................... A47L 11/4011
2008/0082208 A1 * 4/2008 Hong .................. G05D 1/0033
700/245
(Continued)

FOREIGN PATENT DOCUMENTS

| CN | 103645733 A | 3/2014 |
|---|---|---|
| CN | 103784079 A | 5/2014 |

(Continued)

OTHER PUBLICATIONS

The State Intellectual Property Office of People's Republic of China, First Office Action for CN Application No. 201510827895.0, dated Jul. 18, 2017.
(Continued)

*Primary Examiner* — Dalena Tran
(74) *Attorney, Agent, or Firm* — Hodgson Russ LLP

(57) ABSTRACT

The present disclosure provides a smart cleaner, which includes: a remote controller provided with a camera, in which the camera is configured to photograph an image of a target area in a scene; and a body configured to scan the scene, to establish a map of the scene according to a predetermined reference substance, to identify a location of the image in the map after receiving the image sent by the remote controller, and to move to the target area according to the location of the image in the map for performing an operation.

14 Claims, 1 Drawing Sheet

(52) U.S. Cl.
CPC ....... *G05D 1/0225* (2013.01); *G06K 9/00664* (2013.01); *G06K 9/6215* (2013.01); *H04N 7/185* (2013.01); *G05D 2201/0203* (2013.01)

(58) Field of Classification Search
CPC .. G05D 1/0242; G05D 1/0274; G05D 1/0088; G05D 1/0231; H04N 21/4223; H04N 21/4728; G06K 9/00664; G06K 9/6215; A47L 11/4011; A47L 11/4061
USPC ............ 700/257, 253; 701/26, 400; 382/106
See application file for complete search history.

(56) References Cited

U.S. PATENT DOCUMENTS

2011/0264305 A1* 10/2011 Choe .................... G05D 1/0246
701/2

2016/0027207 A1* 1/2016 Hillen ..................... G06T 17/00
348/207.1
2016/0188977 A1* 6/2016 Kearns ............... G06K 9/00664
348/113

FOREIGN PATENT DOCUMENTS

| CN | 104423797 A | 3/2015 |
|---|---|---|
| CN | 105005305 A | 10/2015 |
| CN | 105302131 A | 2/2016 |
| CN | 105476553 A | 4/2016 |
| EP | 2330471 A2 | 6/2011 |

OTHER PUBLICATIONS

ISA/CN, English Translation of International Search Report for PCT/CN2016/092755, dated Sep. 27, 2016.

* cited by examiner

SMART CLEANER

CROSS REFERENCE TO RELATED APPLICATION

This application claims priority to Chinese Patent Application No. 201510827895.0, filed with the State Intellectual Property Office of P. R. China on Nov. 25, 2015, the entire contents of which are incorporated herein by reference.

FIELD

The present disclosure relates to the field of life electrical appliance, and more particularly relates to a smart cleaner.

BACKGROUND

Presently, with the improvement of living standards, a smart cleaner becomes very popular because of simplicity of operator and convenience of usage.

Typically, there is a focus cleaning mode in cleaning modes of the smart cleaner. A user needs to move the smart cleaner to a predetermined area to be cleaned firstly, or enables the smart cleaner to move to the predetermined area to be cleaned by controlling direction keys on a remote controller, and then the smart cleaner may perform a focus cleaning on the predetermined area in a spiral mode or the like. However, in the above method of moving the smart cleaner, it is required to move by man or by controlling the direction keys on the remote controller, which cannot realize a fast-moving and may consume the user's physical strength and energy, and thus the user experience is poor.

SUMMARY

The present disclosure aims to solve at least one of the problems in the related art to some extent.

Accordingly, an objective of the present disclosure is to provide a smart cleaner, which may quickly move to a target area and save the user's physical strength and energy, thereby improving the user experience.

In order to realize the above objective, embodiments of a first aspect of the present disclosure provide a smart cleaner. The smart cleaner includes: a remote controller, provided with a camera, in which the camera is configured to photograph an image of a target area in a scene; and a body configured to scan the scene, and to establish a map of the scene according to a predetermined reference substance, and to identify a location of the image in the map after receiving the image sent by the remote controller, and to move to the target area according to the location of the image in the map for performing an operation.

Additional aspects and advantages of the embodiments of the present disclosure will be given in part in the following descriptions, become apparent in part from the following descriptions, or be learned from the practice of the embodiments of the present disclosure.

DETAILED DESCRIPTION

Figure 1:
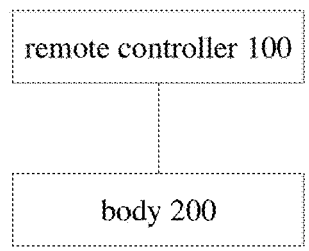
FIG. 1 is a block diagram illustrating a smart cleaner according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

In the following, a smart cleaner provided by embodiments of the present disclosure will be described in detail with reference to accompanying drawings.

FIG. 1 is a schematic block diagram illustrating a smart cleaner according to an embodiment of the present disclosure. As shown in FIG. 1, the smart cleaner includes a remote controller 100 and a body 200.

The remote controller 100 has a camera. The camera is configured to photograph an image of a target area in a scene. The body 200 is configured to scan the scene, and to establish a map of the scene according to a predetermined reference substance, and to identify a location of the image in the map after receiving the image sent by the remote controller 100, and to move to the target area according to the location of the image in the map for performing an operation.

Figure 2:
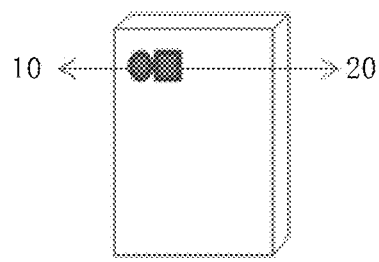
FIG. 2 is a schematic diagram illustrating a back side of a remote controller of a smart cleaner according to an embodiment of the present disclosure.
Figure 3:
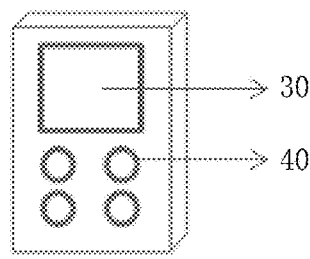
FIG. 3 is a schematic diagram illustrating a front side of a remote controller of a smart cleaner according to an embodiment of the present disclosure.

Specifically, as shown in FIGS. 2-3, the remote controller 100 may include a camera 10, a scanning area 20, a display screen 30 and a button 40. The back side of the remote controller 100 includes the camera 10 and the scanning area 20, and the front side of the remote controller 100 includes the display screen 30 and the button 40.

In embodiments of the present disclosure, the predetermined reference substance may be determined according to actual situations. The predetermined reference substance may be cracks on ground in the scene, or particular patterns on ground in the scene, etc. The scene may also be determined according to actual situations. The scene may be an office, a bedroom, or a living room, etc. There may be multiple predetermined reference substances.

It should be understood that, the map of the scene may be established before the smart cleaner is used for the first time, or during a process of using the smart cleaner for the first time, for example, the map of the scene may be established in a manner of recording process during the process of using the smart cleaner for the first time.

In an embodiment of the present disclosure, the body is provided with a sensor. The sensor is disposed on a chassis of the body. The sensor may be a camera.

Specifically, when the smart cleaner is used for the first time, the body 200 turns on the sensor (for example, the camera) on the chassis and enters into a regular cleaning mode. The body 200 starts to clean with respect to the scene (for example, an indoor). During the cleaning process of the body 200, the body 200 may scan the ground and via the sensor on its chassis generate images. The body 200 may set a current position of a first acquired predetermined reference substance (for example, a specific pattern on ground in the scene) as a coordinate origin to establish a coordinate system, for example, a right-hand coordinate system. The coordinates of the predetermined reference substances acquired subsequently may be recorded in the right-hand coordinate system. When the body 200 completes one cleaning task, the map of the scene may be established completely, and the map of the scene may be stored. The right-hand coordinate system established in the map of the scene may assist the body 200 in positioning during the work of the body 200.

When the body 200 performs the cleaning task again, cleaning can be carried out in accordance with the established map of the scene.

In an embodiment of the present disclosure, the body 200 is configured to move to the target area according to the location of the image in the map for performing an operation, by acts of: determining a current location of the body 200 in the map; planning a path according to the location of the image in the map and the current location of the body 200 in the map; and moving to the target area according to the path.

Specifically, when the body 200 receives the photographed image of the target area sent by the remoter controller 100, the body 200 may preferentially determine its specific location (for example, a coordinate point) in the map of the current scene, and then compare the received image of the target area with the map of the scene established by the body 200 itself, and then determine whether the image of the target area is one area in the map of the scene. If the captured image of the target area is one area in the map of the scene, the body 200 may calculate a displacement according to a location of the target area in the map of the scene and the current location of the body 200 in the map of the scene, and plan a shortest path to the target area, and finally move to the target area according to the planed path. If the image of the target area is not one area in the map of the scene, the body 200 may prompt the user that the photographed target area is not in the above map of the scene. The method for prompting the user may be a speech prompt.

In an embodiment of the present disclosure, the target area includes at least one of an area to be cleaned, a return area and a security area. The remote controller 100 is further configured to send a control instruction to the body 200. The control instruction includes at least one of a cleaning instruction, a returning instruction and a security instruction. The body 200 is further configured to perform the cleaning instruction after moving to the area to be cleaned if the control instruction is the cleaning instruction, and to move to the return area for being charged if the control instruction is the returning instruction, and to perform a monitoring after moving to the security area if the control instruction is the security instruction.

Specifically, after the body 200 receives the cleaning instruction, it may be controlled to receive the photographed image of the area to be cleaned sent by the remote controller 100. When the body 200 receives the photographed image of the area to be cleaned sent by the remote controller 100, it is controlled to call the established map of the scene, and to compare the established map of the scene with the photographed image of the area to be cleaned sent by the remote controller 100, and to determine whether the photographed image of the area to be cleaned is one area in the map of the scene. If the photographed image of the area to be cleaned is one area in the map of the scene, a displacement may be calculated according to a location of the area to be cleaned in the map of the scene and the current location of the body 200 in the map of the scene, and then a shortest path to the area to be cleaned may be planed, and finally the body 200 moves to the above area to be cleaned according to the planed path for performing the cleaning. If the photographed image of the area to be cleaned is not one area in the map of the scene, the body 200 may prompt the user that the photographed area to be cleaned is not in the above map of the scene.

After the body 200 receives the returning instruction, it may be controlled to receive the photographed image of the return area sent by the remote controller 100. When the body 200 receives the photographed image of the return area sent by the remote controller 100, it is controlled to call the established map of the scene, and to compare the established map of the scene with the photographed image of the return area sent by the remote controller 100, and to determine whether the photographed image of the return area is one area in the map of the scene. If the photographed image of the return area is one area in the map of the scene, a displacement may be calculated according to a location of the return area in the map of the scene and the current location of the body 200 in the map of the scene, and then a shortest path to the return area may be planed, and finally the body 200 moves to the above return area according to the planed path and returns to a charging cradle for being charged. If the photographed image of the return area is not one area in the map of the scene, the body 200 may prompt the user that the photographed return area is not in the above map of the scene. The charging cradle may be not in the above return area. It should be understood that, the body 200 and the charging cradle can sense each other's position in a certain range for automatically searching for each other.

After the body 200 receives the security instruction, it may be controlled to receive the photographed image of the security area sent by the remote controller 100. When the body 200 receives the photographed image of the security area sent by the remote controller 100, it is controlled to call the established map of the scene, and to compare the established map of the scene with the photographed image of the security area sent by the remote controller 100, and to determine whether the photographed image of the security area is one area in the map of the scene. If the photographed image of the security area is one area in the map of the scene, a displacement may be calculated according to a location of the security area in the map of the scene and the current location of the body 200 in the map of the scene, and then a shortest path to the security area may be planed, and finally the body 200 moves to the security area according to the planed path for monitoring.

Further, in an embodiment of the present disclosure, the camera 10 in the remote controller 100 is further configured to monitor.

In an embodiment of the present disclosure, the body 200 is provided with a groove and the remote controller 100 is arranged in the groove. In another embodiment of the present disclosure, the groove has a predetermined inclination angle. In still another embodiment of the present disclosure, the body 200 is provided with a snap and the remote controller 100 is disposed on the body 200 through the snap. The predetermined inclination angle may be set according to actual situations, for example, the predetermined inclination angle may be 60°.

Figure 4:
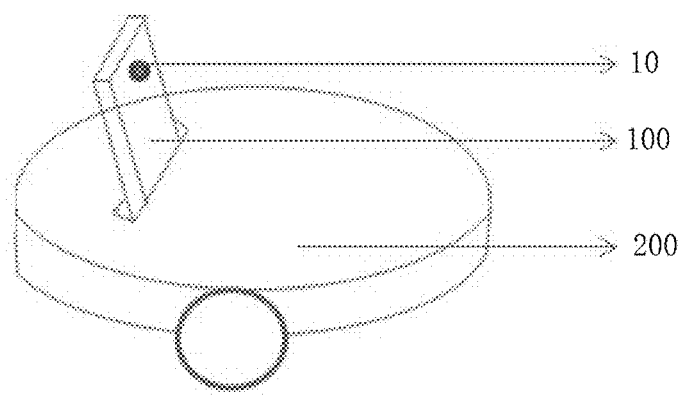
FIG. 4 is a schematic diagram illustrating a smart cleaner according to an embodiment of the present disclosure.

As shown in FIG. 4, it should be understood that, after the body 200 moves to the above security area, the user may place the remote controller 100 in the groove of the body 200, so as to facilitate security monitoring. Further, the remote controller 100 may be coupled to the body 200 wirelessly to send the monitored video images to the body 200 in real-time for being stored. The user may take advantage of USB device or other devices to read out the monitored video images from the body 200 as needed.

In conclusion, in the embodiments of the present disclosure, after the body 200 receives the cleaning instruction, the returning instruction and the security instruction, it may analysis and calculate the displacement according to the received area image sent by the remote controller 100, the map of the scene established by the body 200 and the current location of the body 200 in the map of the scene, and may plan the shortest path to each of the above areas, such that the body 200 may move quickly to one of the above areas in accordance with the above planned path, thereby avoiding unnecessary consumption of the user's physical strength and energy, and improving the user experience.

With the smart cleaner of embodiments of the present disclosure, the scene is scanned by the body, and the map of the scene is established according to the predetermined reference substance, and the location of the image in the map is identified after the image sent by the remote controller is received, and then the body may move to the target area according to the location of the image in the map for performing the operation. This smart cleaner may move quickly to the target area and save the user's physical strength and energy not more, thereby improving the user experience.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion for simplifying the description of the present disclosure, but do not alone indicate or imply that the device or element referred to must have a particular orientation. They cannot be seen as limits to the present disclosure.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more, unless specified otherwise.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In the description of the present disclosure, a structure in which a first feature is "on" a second feature may include an embodiment in which the first feature directly contacts the second feature, and may also include an embodiment in which an additional feature is formed between the first feature and the second feature. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature is at a height higher than that of the second feature. While a first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature is at a height lower than that of the second feature.

Reference throughout this specification to "an embodiment", "some embodiments", "one embodiment", "an example", "a specific examples", or "some examples" means that a particular feature, structure, material, or characteristic described in connection with the embodiment or example is included in at least one embodiment or example of the disclosure. Thus, the appearances of the phrases such as "in some embodiments", "in one embodiment", "in an embodiment", "an example", "a specific examples", or "some examples" in various places throughout this specification are not necessarily referring to the same embodiment or example of the disclosure. Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. A smart cleaner comprising:
   a remote controller, provided with a camera, wherein the camera is configured to photograph an image of a target area in a scene; and
   a body, configured to scan the scene, to establish a map of the scene according to a predetermined reference substance, to identify a location of the image in the map after receiving the image sent by the remote controller, and to move to the target area according to the location of the image in the map for performing an operation;
   wherein the body includes a dock configured to receive the remote controller.

2. The smart cleaner according to claim 1, wherein the body is configured to move to the target area according to the location of the image in the map for performing an operation, by acts of:
   determining a current location of the body in the map;
   planning a path according to the location of the image in the map and the current location of the body in the map; and
   moving to the target area according to the path.

3. The smart cleaner according to claim 2, wherein planning a path according to the location of the image in the map and the current location of the body in the map, comprises:
   calculating a displacement according to the location of the image in the map and the current location of the body in the map; and
   planning a shortest path to the target area according to the displacement.

4. The smart cleaner according to claim 1, wherein
   the target area comprises at least one of an area to be cleaned, a return area and a security area;
   the remote controller is further configured to send a control instruction to the body, wherein the control instruction comprises at least one of a cleaning instruction, a returning instruction and a security instruction; and the body is further configured to:

perform the cleaning instruction after moving to the area to be cleaned if the control instruction is the cleaning instruction;

move to the return area for being charged if the control instruction is the returning instruction;

perform a monitoring after moving to the security area if the control instruction is the security instruction.

5. The smart cleaner according to claim 4, wherein power is supplied by a battery of the body when the body is performing the security instruction, and the body is configured to automatically move to the return area for being charged if it is determined that an electric quantity of the battery is less than a predetermined value, and to return to the security area for monitoring after the battery is completely charged.

6. The smart cleaner according to claim 4, wherein the body is further configured to determine whether there is a charging power supply in the return area after moving to the return area for being charged, and to provide a prompt if there is no charging power supply in the return area.

7. The smart cleaner according to claim 6, wherein the prompt is a speech prompt.

8. The smart cleaner according to claim 1, wherein the body is provided with a sensor disposed on a chassis of the body.

9. The smart cleaner according to claim 8, wherein the groove has a predetermined inclination angle.

10. The smart cleaner according to claim 9, wherein the predetermined inclination angle is 60°.

11. The smart cleaner according to claim 1, wherein the camera is further configured to monitor.

12. The smart cleaner according to claim 1, wherein the dock is provided with a groove and the remote controller is arranged in the groove.

13. The smart cleaner according to claim 1, wherein the dock is provided with a snap and the remote controller is disposed on the body through the snap.

14. The smart cleaner according to claim 1, wherein the predetermined reference substance comprises at least one of a crack on a ground in the scene and a pattern on the ground in the scene.

* * * * *